United States Patent
Chang et al.

(10) Patent No.: US 8,879,677 B2
(45) Date of Patent: Nov. 4, 2014

(54) METHOD FOR COMPENSATING MISMATCH OF IN-PHASE SIGNAL AND QUADRATURE SIGNAL OF TRANSMITTER/RECEIVER

(71) Applicant: Realtek Semiconductor Corp., HsinChu (TW)

(72) Inventors: Yuan-Shuo Chang, Taoyuan County (TW); Hong-Ta Hsu, Hsinchu (TW)

(73) Assignee: Realtek Semiconductor Corp., Science Park, HsinChu, (TW)

( * ) Notice: Subject to any disclaimer, the term of this patent is extended or adjusted under 35 U.S.C. 154(b) by 10 days.

(21) Appl. No.: 13/761,129

(22) Filed: Feb. 6, 2013

(65) Prior Publication Data

US 2013/0215999 A1    Aug. 22, 2013

(30) Foreign Application Priority Data

Feb. 22, 2012    (TW) .............................. 101105797 A

(51) Int. Cl.
*H04L 1/00* (2006.01)
*H04L 1/24* (2006.01)

(52) U.S. Cl.
CPC ............... *H04L 1/0001* (2013.01); *H04L 1/24* (2013.01)
USPC ........................................................ 375/346

(58) Field of Classification Search
CPC .............. H04B 1/00; H04B 1/10; H04B 1/12; H04B 1/16; H04B 1/38; H04B 1/44; H04B 7/00; H04B 7/08; H04B 17/00; H03K 9/00; H04L 1/00; H04L 1/0001; H04L 5/12; H04L 5/16; H04L 23/02; H04L 25/08; H04L 27/00; H04L 27/22; H04Q 7/20
USPC .......... 370/210; 375/219, 221, 226, 316, 317, 375/324, 329, 350; 455/63.1, 67.11, 67.14, 455/73, 115.1, 226.1, 296, 307, 310, 318, 455/501, 552.1; 714/746
See application file for complete search history.

(56) References Cited

U.S. PATENT DOCUMENTS

| | | | |
|---|---|---|---|
| 6,892,060 B2* | 5/2005 | Zheng | 455/302 |
| 6,940,916 B1* | 9/2005 | Warner et al. | 375/261 |
| 7,010,059 B2* | 3/2006 | Song et al. | 375/316 |

(Continued)

FOREIGN PATENT DOCUMENTS

| | | |
|---|---|---|
| TW | 201002002 | 1/2010 |
| TW | I327851 | 7/2010 |
| TW | 201039550 | 11/2010 |

OTHER PUBLICATIONS

H. Chen, "Adaptive I/Q Imbalance Compensation for RF Transceivers" 2004, Bell Laboratories.*

*Primary Examiner* — Jaison Joseph
*Assistant Examiner* — Shawkat M Ali
(74) *Attorney, Agent, or Firm* — Winston Hsu; Scott Margo

(57) ABSTRACT

A method for compensating mismatches of an in-phase signal and a quadrature signal of a transmitter/receiver is provided. The method includes: receiving a plurality of test signals to generate two groups of factors, respectively, where each group of factors is applied to two multipliers utilized for compensating a gain mismatch and a phase mismatch of the in-phase signal and the quadrature signal of the transmitter/receiver; then calculating a delay mismatch of the in-phase signal and the quadrature signal according to the two groups of factors.

10 Claims, 8 Drawing Sheets

(56) References Cited

U.S. PATENT DOCUMENTS

| | | | |
|---|---|---|---|
| 7,155,180 B2* | 12/2006 | Kim et al. | 455/114.2 |
| 7,184,714 B1* | 2/2007 | Kutagulla et al. | 455/73 |
| 7,570,923 B2* | 8/2009 | Kiss et al. | 455/67.14 |
| 7,580,692 B2* | 8/2009 | Kravets | 455/302 |
| 7,925,217 B2* | 4/2011 | Park et al. | 455/67.11 |
| 8,406,344 B2* | 3/2013 | Eitel | 375/324 |
| 2002/0115416 A1* | 8/2002 | Riou et al. | 455/115 |
| 2003/0143966 A1 | 7/2003 | Kim | |
| 2003/0223480 A1* | 12/2003 | Cafarella | 375/219 |
| 2004/0087279 A1* | 5/2004 | Muschallik et al. | 455/73 |
| 2006/0109893 A1* | 5/2006 | Chen et al. | 375/219 |
| 2006/0178165 A1* | 8/2006 | Vassiliou et al. | 455/552.1 |
| 2007/0025433 A1* | 2/2007 | Hammerschmidt et al. | 375/224 |
| 2008/0025381 A1* | 1/2008 | Lee et al. | 375/219 |
| 2008/0063113 A1* | 3/2008 | Gao et al. | 375/296 |
| 2008/0118004 A1* | 5/2008 | Forenza et al. | 375/299 |
| 2008/0166985 A1* | 7/2008 | Wortel et al. | 455/233.1 |
| 2008/0212711 A1* | 9/2008 | Auranen et al. | 375/295 |
| 2011/0075715 A1* | 3/2011 | Kravitz | 375/221 |
| 2011/0292978 A1* | 12/2011 | Kravitz | 375/221 |

* cited by examiner

__US 8,879,677 B2__

METHOD FOR COMPENSATING MISMATCH OF IN-PHASE SIGNAL AND QUADRATURE SIGNAL OF TRANSMITTER/RECEIVER

BACKGROUND OF THE INVENTION

1. Field of the Invention

The present invention relates to a method for compensating a mismatch of an in-phase signal and a quadrature signal of a receiver or a transmitter, and more particularly, to a method for compensating gain mismatch/phase mismatch/path delay mismatch of an in-phase signal and a quadrature signal of a receiver or a transmitter.

2. Description of the Prior Art

In a conventional zero-IF (zero intermediate frequency) receiver, a radio frequency signal can be directly converted into a baseband signal. Because there is no middle frequency required to be selected, the image frequency interference of a super-heterodyne receiver will not be happened in the zero-IF receiver, and the zero-IF receiver does not need a high quality filter. In addition, because the zero-IF receiver includes only one local oscillator (i.e. only one phase noise source), the zero-IF receiver does not need large and expensive filter, and can be simply integrated. However, in the zero-IF receiver, the in-phase signal and the quadrature signal may have I/Q mismatch issue because the oscillation signals supplied to the in-phase channel and the quadrature channel are not matched. In addition, because the path delays of the in-phase channel and the quadrature channel may be different, the in-phase signal and the quadrature signal may also have the path delay mismatch issue.

Because the gain mismatch/phase mismatch/path delay mismatch of the in-phase signal and the quadrature signal may influence the following signal processing operation (e.g., the bit error rate (BER) increases), how to design a method for estimating and compensating the gain mismatch/phase mismatch/path delay mismatch of the in-phase signal and the quadrature signal is an important topic.

SUMMARY OF THE INVENTION

It is therefore an objective of the present invention to provide a method for compensating gain mismatch/phase mismatch/path delay mismatch of an in-phase signal and a quadrature signal of a receiver or a transmitter, to solve the above-mentioned problem.

According to one embodiment of the present invention, a method for compensating a mismatch of an in-phase signal and a quadrature signal of a receiver is disclosed, where the receiver comprises a first channel, a second channel and a second multiplier, where the first channel comprises: a first mixer, for mixing a received signal with a first local oscillation signal to generate a first signal; a first multiplier, coupled to the first mixer, for generating an adjusted first signal according to the first signal; and an adder, coupled to the first multiplier; the second channel comprises: a second mixer, for mixing the received signal with a second local oscillation signal to generate a second signal; and an adjustable delay unit, coupled to the second mixer, for delaying the second signal to generate a delayed second signal; and the second multiplier is coupled between the adjustable delay unit and the adder, and is used for generating an adjusted second signal according to the delayed second signal, where the adder adds the adjusted first signal and the adjusted second signal to generate a compensated first signal; the compensated first signal is one of the in-phase signal and the quadrature signal, and the delayed second signal is the other one of the in-phase signal and the quadrature signal; and the method comprises: disabling the adjustable delay unit; receiving a first test signal to serve as the received signal to determine a first group of factors of the first multiplier and the second multiplier; receiving a second test signal to serve as the received signal to determine a second group of factors of the first multiplier and the second multiplier; and calculating a delay amount of the adjustable delay unit according to the first group of factors and the second group of factors.

According to another embodiment of the present invention, a method for compensating a mismatch of an in-phase signal and a quadrature signal of a receiver is disclosed, where the receiver comprises a first channel, a second channel and a second multiplier, where the first channel comprises: a first mixer, for mixing a received signal with a first local oscillation signal to generate a first signal; an adjustable delay unit, coupled to the first mixer, for delaying the first signal to generate a delayed first signal; a first multiplier, coupled to the adjustable delay unit, for generating an adjusted first signal according to the delayed first signal; and an adder, coupled to the first multiplier; the second channel comprises: a second mixer, for mixing the received signal with a second local oscillation signal to generate a second signal; and the second multiplier is coupled between the second mixer and the adder, and is used for generating an adjusted second signal according to the second signal, wherein the adder adds the adjusted first signal and the adjusted second signal to generate a compensated first signal; where the compensated first signal is one of the in-phase signal and the quadrature signal, and the second signal is the other one of the in-phase signal and the quadrature signal; and the method comprises: disabling the adjustable delay unit; receiving a first test signal to serve as the received signal to determine a first group of factors of the first multiplier and the second multiplier; receiving a second test signal to serve as the received signal to determine a second group of factors of the first multiplier and the second multiplier; and calculating a delay amount of the adjustable delay unit according to the first group of factors and the second group of factors.

According to another embodiment of the present invention, a method for compensating a mismatch of an in-phase signal and a quadrature signal of a transmitter is disclosed, wherein the transmitter comprises a first channel, a second multiplier and a second channel, where the first channel, comprises: a first multiplier, for receiving a first signal to generate a first adjusted first signal; and a first mixer, coupled to the first multiplier, for mixing the adjusted first signal with a first local oscillation signal to generate a mixed first signal; the second multiplier is for receiving the first signal to generate a second adjusted first signal; the second channel comprises: an adder, coupled to the second multiplier, for adding the second adjusted first signal and a second signal to generate an adjusted second signal; an adjustable delay unit, coupled to the adder, for delaying the adjusted second signal to generate a delayed second signal; and a second mixer, coupled to the adjustable delay unit, for mixing the delayed second signal with a second local oscillation signal to generate a mixed second signal; where the first adjusted first signal is one of the in-phase signal and the quadrature signal, and the delayed second signal is the other one of the in-phase signal and the quadrature signal; and the method comprises: disabling the adjustable delay unit; transmitting a first test signal and a second test signal to serve as the first signal and the second signal, respectively, to determine a first group of factors of the first multiplier and the second multiplier; transmitting a third test signal and a fourth test signal to serve as the first signal and the second signal, respectively, to determine a second group of factors of the first multiplier and the second multiplier; and calculating a delay amount of the adjustable delay unit according to the first group of factors and the second group of factors.

According to another embodiment of the present invention, a method for compensating a mismatch of an in-phase signal and a quadrature signal of a transmitter is disclosed, where the transmitter comprises first channel, a second multiplier and a second channel, where the first channel comprises: a first multiplier, for receiving a first signal to generate a first adjusted first signal; an adjustable delay unit, coupled to the first multiplier, for delaying the first adjusted first signal to generate a delayed first signal; and a first mixer, coupled to the adjustable delay unit, for mixing the delayed first signal with a first local oscillation signal to generate a mixed first signal; the second multiplier is for receiving the first signal to generate a second adjusted first signal; the second channel comprises: an adder, coupled to the second multiplier, for adding the second adjusted first signal and a second signal to generate an adjusted second signal; and a second mixer, coupled to the adjustable delay unit, for mixing the adjusted second signal with a second local oscillation signal to generate a mixed second signal; where the delayed first signal is one of the in-phase signal and the quadrature signal, and the adjusted second signal is the other one of the in-phase signal and the quadrature signal; and the method comprises: disabling the adjustable delay unit; transmitting a first test signal and a second test signal to serve as the first signal and the second signal, respectively, to determine a first group of factors of the first multiplier and the second multiplier; transmitting a third test signal and a fourth test signal to serve as the first signal and the second signal, respectively, to determine a second group of factors of the first multiplier and the second multiplier; and calculating a delay amount of the adjustable delay unit according to the first group of factors and the second group of factors.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
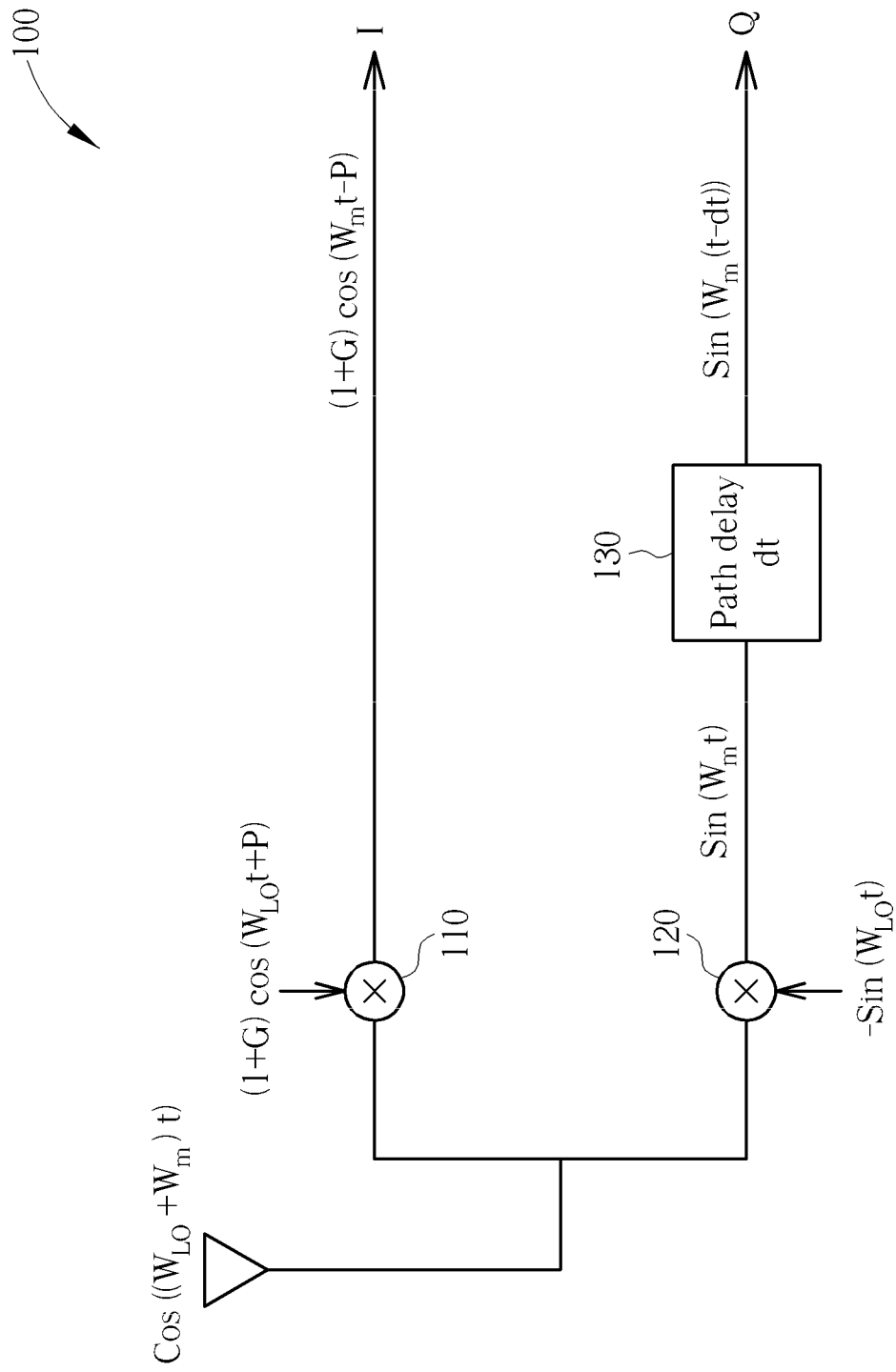
FIG. 1 is a diagram illustrating a gain mismatch/phase mismatch/path delay mismatch of an in-phase signal and a quadrature signal of a prior art receiver.

Please refer to FIG. 1, which is a diagram illustrating a gain mismatch/phase mismatch/path delay mismatch of an in-phase signal and a quadrature signal of a prior art receiver 100, where the receiver 100 includes two mixers 110 and 120; and a path delay 130 shown in FIG. 1 is used to represent a delay difference between an in-phase channel and a quadrature channel, and is not a circuit element. As shown in FIG. 1, the receiver 100 receives a signal that is represented as cos $((w_{LO}+w_m)*t)$, and the signal passes through the mixers 110 and 120 and the path delay 130 to generate the in-phase signal I and the quadrature signal Q, respectively, where the in-phase signal I can be represented as $(1+G)\cos(w_m t-P)$, and the quadrature signal Q can be represented as $\sin(w_m(t-dt))$, where "G" is a value of I/Q gain mismatch, "P" is a value of I/Q phase mismatch, the "dt" is a value of I/Q path delay mismatch, and the "G" value and the "P" value are generated due to the mismatch of two local oscillation signals generated from a local oscillator and supplied to the mixers 110 and 120.

Therefore, the objective of the present invention is to provide a receiver whose in-phase signal I and quadrature signal Q are close to their ideal values, that is $\cos(w_m t)$ and $\sin(w_m t)$, respectively.

Figure 2:
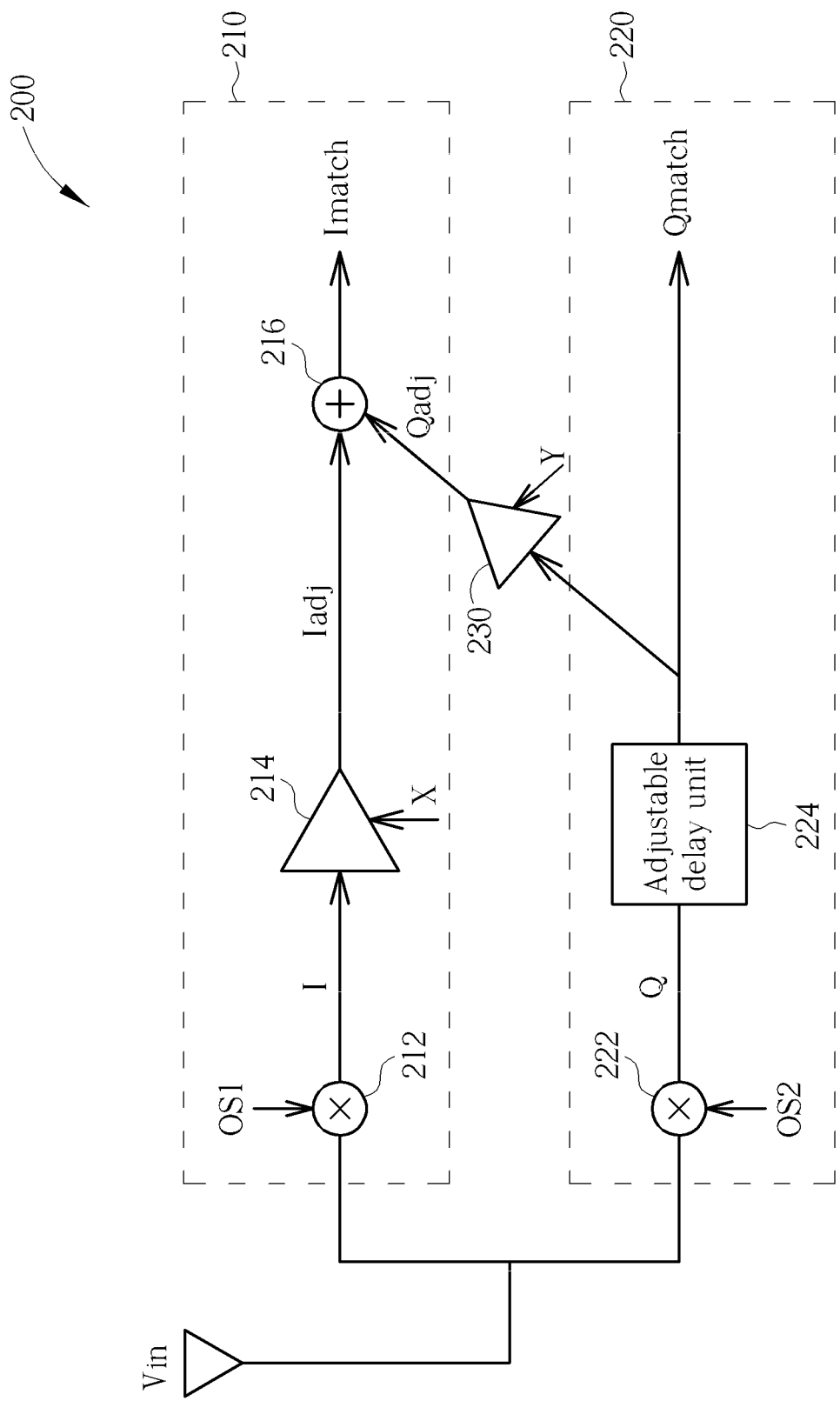
FIG. 2 is a diagram illustrating a diagram illustrating a receiver according to one embodiment of the present invention.

Please refer to FIG. 2, which is a diagram illustrating a diagram illustrating a receiver 200 according to one embodiment of the present invention. As shown in FIG. 2, the receiver 200 includes a first channel 210, a second channel 220 and a multiplier 230, where the first channel 210 includes a mixer 212, a multiplier 214 and an adder 216, and the second channel 220 includes a mixer 222 and an adjustable delay unit 224. In addition, the receiver 200 further includes a control unit (not shown) that is used to generate control signals according to outputs of the first channel 210 and the second channel 220, and the control unit uses the control signals to adjust a factor X of the multiplier 214, a factor Y of the multiplier 230 and a delay amount of the adjustable delay unit 224. In addition, in this embodiment, the receiver 200 is a zero-IF receiver, but it is not meant to be a limitation of the present invention.

In the operations of the receiver 200, the mixer 212 mixes a received signal Vin with a local oscillation signal OS1 to generate an in-phase signal I, the multiplier 214 multiplies the in-phase signal I by the factor X to generate an adjusted in-phase signal Iadj. In addition, the mixer 222 mixes the received signal Vin with a local oscillation signal 052 to generate a quadrature signal Q, and the adjustable delay unit 224 delays the quadrature signal Q to generate a delayed quadrature signal Qmatch. Then, the multiplier 230 multiplies the delayed quadrature signal Qmatch by the factor Y to generate an adjusted quadrature signal Qadj. Finally, the adder 216 adds the adjusted in-phase signal Iadj and the adjusted quadrature signal Qadj to generate a compensated in-phase signal Imatch.

Figure 3:
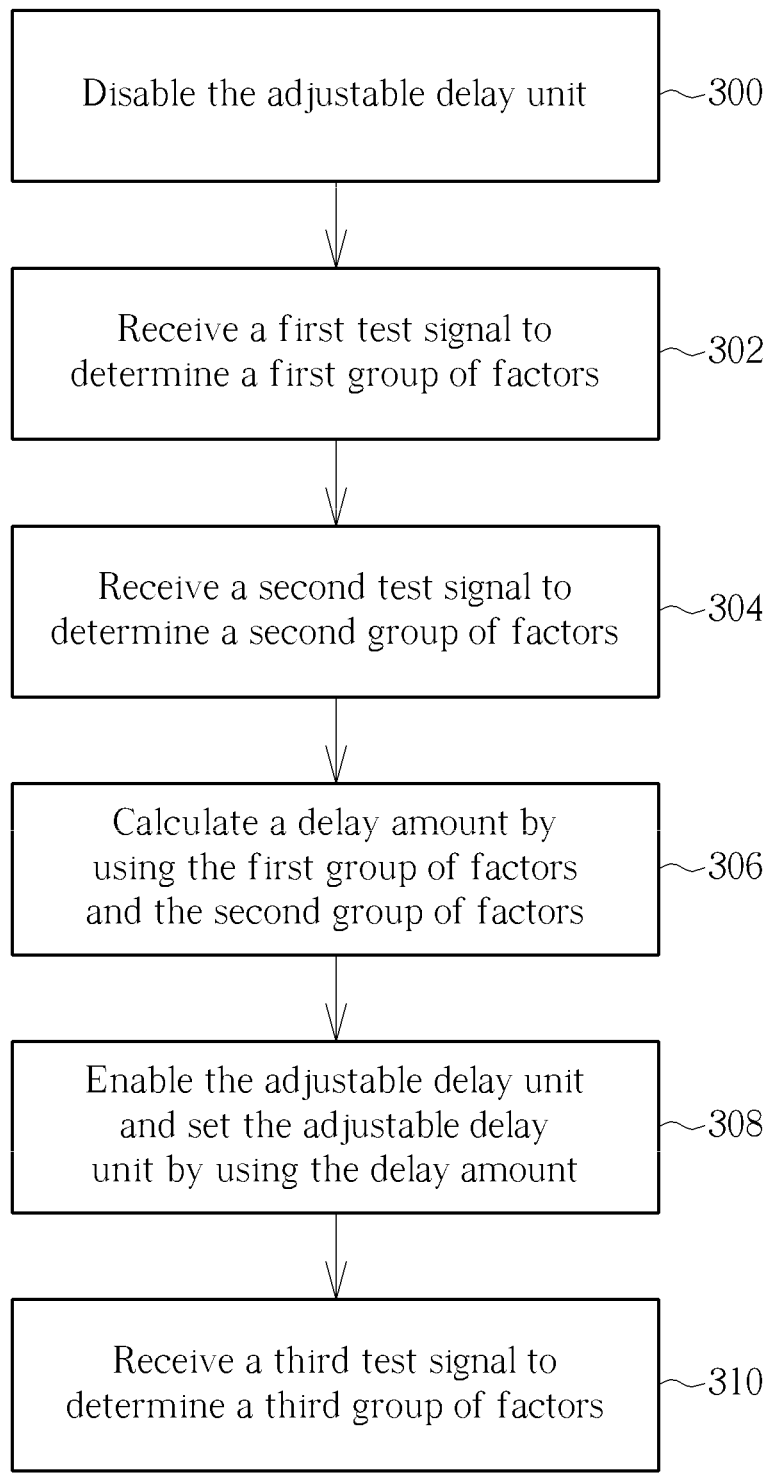
FIG. 3 is a flowchart of a method for compensating a mismatch of the in-phase signal and the quadrature signal of the receiver according to one embodiment of the present invention.

Please refer to FIG. 2 and FIG. 3 together, FIG. 3 is a flowchart of a method for compensating a mismatch of the in-phase signal I and the quadrature signal Q of the receiver 200 according to one embodiment of the present invention. Referring to FIG. 3, the flow is described as follows.

In Step 300, the adjustable delay unit 224 is disabled, that is the delay amount of the adjustable delay unit 224 is set to be 0. In Step 302, the receiver 200 receives a first test signal, where the first test signal is a single tone signal having a frequency f1. Then, the control unit (not shown) adjusts the factor X of the multiplier 214 and the factor Y of the multiplier 230 by referring to an image rejection ratio (IRR) calculated by using the compensated in-phase signal Imatch and the delayed quadrature signal Qmatch to obtain a first group of factors (X1, Y1), where when using the first group of factors (X1, Y1) the receiver 200 has the optimal IRR. Referring to FIG. 1 and FIG. 2, assuming that the outputs of the mixers 212 and 222 are $(1+G)\cos(w_m t-P)$ and $\sin(w_m(t-dt))$, respectively, shown in FIG. 1, the value of Y1 should be close to $(-\tan(P+2\pi f1*dt))$ when the compensated in-phase signal Imatch and the delayed quadrature signal Qmatch have the optimal IRR.

In Step 304, the receiver 200 receives a second test signal, where the second test signal is a single tone signal having a frequency f2. Then, the control unit (not shown) adjusts the factor X of the multiplier 214 and the factor Y of the multiplier 230 by referring to the IRR calculated by using the compensated in-phase signal Imatch and the delayed quadrature signal Qmatch to obtain a second group of factors (X2, Y2), where when using the second group of factors (X2, Y2) the receiver 200 has the optimal IRR. Referring to FIG. 1 and FIG. 2, assuming that the outputs of the mixers 212 and 222 are $(1+G)\cos(w_m t-P)$ and $\sin(w_m(t-dt))$, respectively, shown in FIG. 1, the value of Y2 should be close to $(-\tan(P+2\pi f2*dt))$ when the compensated in-phase signal Imatch and the delayed quadrature signal Qmatch have the optimal IRR.

In Step 306, the control unit uses the first group of factors (X1, Y1) and the second group of factors (X2, Y2) to calculate a delay amount of the adjustable delay unit 224. In detail, because in Steps 302 and 304 it is calculated that: $Y1 \approx (-\tan(P+2\pi f1*dt))$ and $Y2 \approx (-\tan(P+2\pi f2*dt))$, the delay amount dt between the in-phase signal I and the quadrature signal Q can be calculated by using the following formula:

$dt \approx (Y1-Y2)/(2\pi(f2-f1))$.

In addition, because $dt=\Delta*Ts=\Delta/Fs$, where Ts and Fs are a sampling clock period and a sampling clock frequency of an analog-to-digital converter (ADC) of the receiver 200, respectively, a delay parameter $\Delta$ used by the adjustable delay unit 224 can be calculated as follows:

$$\Delta = \frac{(Y1-Y2)}{\frac{2\pi(f2-f1)}{Fs}} = \frac{(Y1-Y2)}{\frac{2\pi(\text{tone\_idx}(f2)-\text{tone\_idx}(f1))}{\text{FFT\_pts}}},$$

where FFT_pts is a number of points used when performing a fast Fourier Transform upon the first test signal and the second test signal, and tone_index is an index of the tone/frequency.

In Step 308, the control unit (not shown) enables the adjustable delay unit 224 and sets adjustable delay unit 224 according to the delay parameter $\Delta$ or the delay amount dt.

In Step 310, the receiver 200 receives a third test signal, where the third test signal is a single tone signal having a frequency f3. Then, the control unit (not shown) adjusts the factor X of the multiplier 214 and the factor Y of the multiplier 230 by referring to the IRR calculated by using the compensated in-phase signal Imatch and the delayed quadrature signal Qmatch to obtain a third group of factors (X3, Y3), where when using the third group of factors (X3, Y3) the receiver 200 has the optimal IRR. The third group of factors (X3, Y3) are used by the multipliers 214 and 230 of the receiver 200 in the following operations.

In light of above, after the delay parameter $\Delta$ used in adjustable delay unit 224, the factor X3 of the multiplier 214 and the factor Y3 of the multiplier 230 are determined, the receiver 200 can eliminate the gain mismatch/phase mismatch/path delay mismatch of the in-phase signal I and the quadrature signal Q, and the gain/phase/path delay of the compensated in-phase signal Imatch and the delayed quadrature signal Qmatch are matched. In particular, when eliminating the path delay mismatch of the in-phase signal I and the quadrature signal Q, the receiver 200 can simultaneously eliminate the frequency-dependent phase mismatch and the frequency-independent phase mismatch.

It is noted that, in the embodiment shown in FIG. 2, the first channel 210 is the in-phase channel and the second channel 220 is the quadrature channel. In other embodiments, however, the first channel 210 can be the quadrature channel and the second channel 220 can be the in-phase channel, and the determination steps of the delay parameter $\Delta$, the factor X3 of the multiplier 214 and the factor Y3 of the multiplier 230 are similar to the steps shown in FIG. 3 (only the formula for calculating the delay parameter $\Delta$ is different from the formula described in step 306). Because a person skilled in this art should understand how to derive the formula to obtain the delay parameter $\Delta$ and the two factors X3 and Y3 after reading the above-mentioned disclosure, further descriptions are omitted here.

Figure 4:
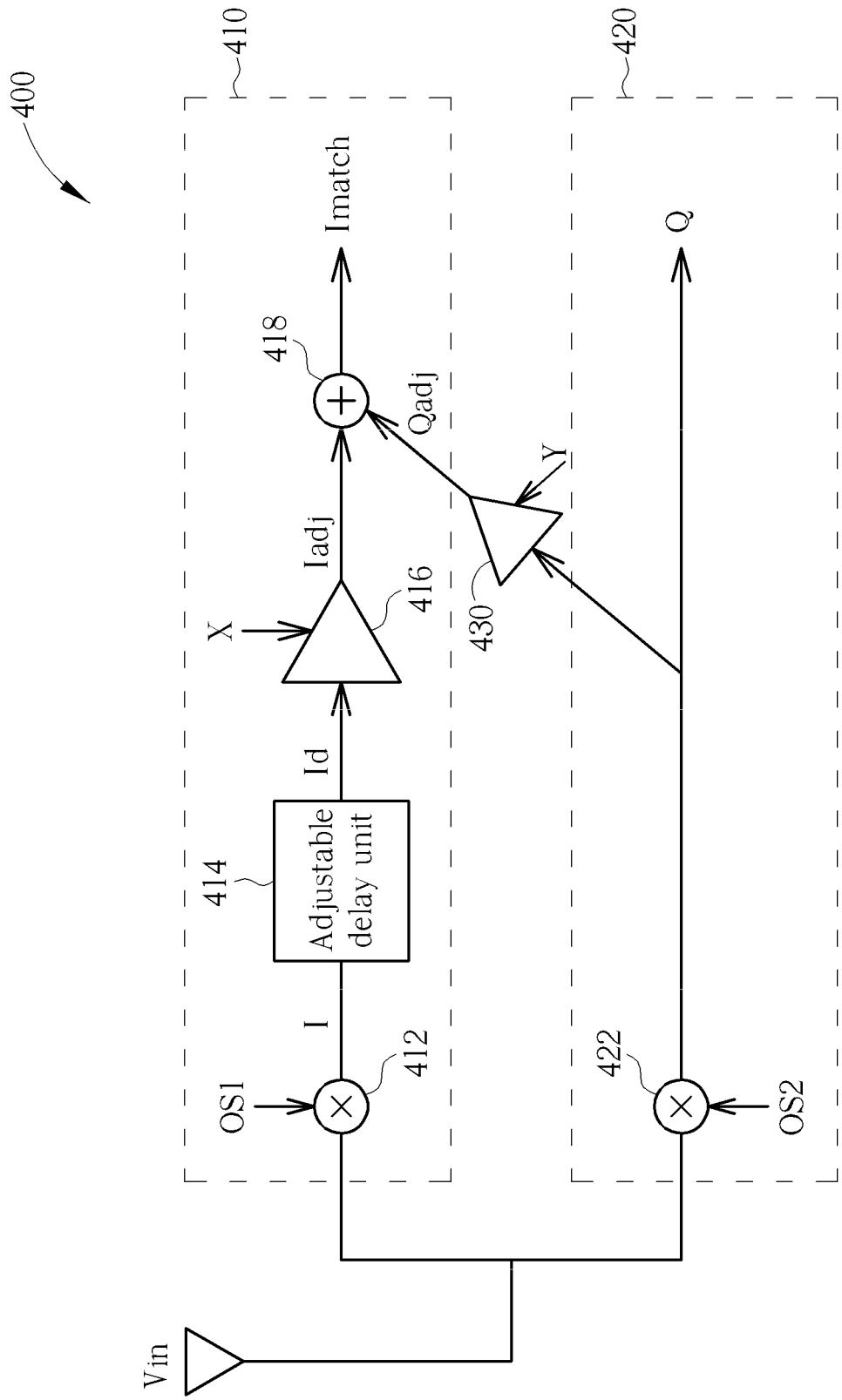
FIG. 4 is a diagram illustrating a diagram illustrating a receiver according to another embodiment of the present invention.

Please refer to FIG. 4, which is a diagram illustrating a receiver 400 according to another embodiment of the present invention. As shown in FIG. 4, the receiver 400 includes a first channel 410, a second channel 420 and a multiplier 430, where the first channel 410 includes a mixer 412, an adjustable delay unit 414, a multiplier 416 and an adder 418, and the second channel 420 includes a mixer 422. In addition, the receiver 400 further includes a control unit (not shown) that is used to generate control signals according to outputs of the first channel 410 and the second channel 420, and the control unit uses the control signals to adjust a factor X of the multiplier 416, a factor Y of the multiplier 430 and a delay amount of the adjustable delay unit 414.

In the operations of the receiver 400, the mixer 412 mixes a received signal Vin with a local oscillation signal OS1 to generate an in-phase signal I, the adjustable delay unit 414 delays the in-phase signal I to generate a delayed in-phase signal Id, and the multiplier 416 multiplies the delayed in-phase signal Id by the factor X to obtain an adjusted in-phase signal Iadj. In addition, the mixer 422 mixes the received signal Vin with a local oscillation signal 052 to generate a quadrature signal Q, the multiplier 430 multiplies the quadrature signal Q by the factor Y to obtain an adjusted quadrature signal Qadj. Finally, the adder 418 adds the adjusted in-phase signal Iadj and the adjusted quadrature signal Qadj to generate a compensated in-phase signal Imatch.

The method for determining the delay parameter of the adjustable delay unit 414, the factor X of the multiplier 416 and the factor Y of the multiplier 430 are similar to the steps shown in FIG. 3, and only the formula for calculating the delay parameter of the adjustable delay unit 414 is different from the formula for calculating the delay parameter Δ of the adjustable delay unit 224 of the receiver 200 shown in FIG. 2 (in Step 306). Because a person skilled in this art should understand the following calculations after reading the above-mentioned disclosure (e.g., the delay parameter of the adjustable delay unit 414 can be calculated by the formula:

$$\Delta = -\frac{(Y1-Y2)}{\underbrace{2\pi(f2-f1)}_{Fs}} = -\frac{(Y1-Y2)}{\underbrace{2\pi(\text{tone\_idx}(f2)-\text{tone\_idx}(f1))}_{FFT\_pts}},$$

that is a negative of the delay parameter described in the embodiment shown in FIG. 2), further descriptions are omitted here.

It is noted that, in the embodiment shown in FIG. 4, the first channel 410 is the in-phase channel and the second channel 420 is the quadrature channel. In other embodiments, however, the first channel 410 can be the quadrature channel and the second channel 420 can be the in-phase channel, and the determination steps of the delay parameter Δ, the factor X3 of the multiplier 416 and the factor Y3 of the multiplier 430 are similar to the steps shown in FIG. 3 (only the formula for calculating the delay parameter Δ is different from the formula described in step 306). Because a person skilled in this art should understand how to derive the formula to obtain the delay parameter Δ and the two factors X3 and Y3 after reading the above-mentioned disclosure, further descriptions are omitted here.

Figure 5:
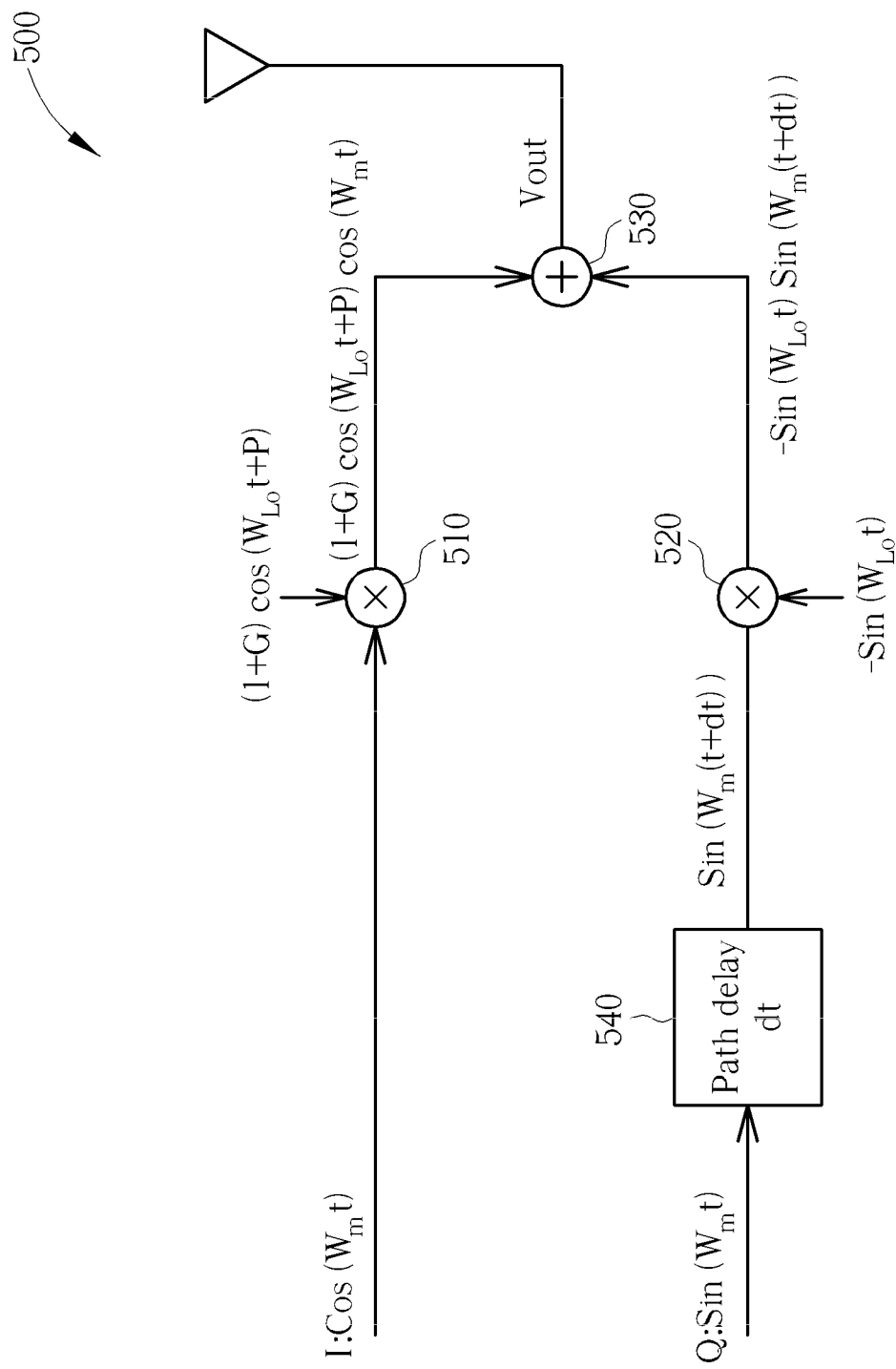
FIG. 5 is a diagram illustrating a gain mismatch/phase mismatch/path delay mismatch of an in-phase signal and a quadrature signal of a prior art transmitter.

Please refer to FIG. 5, which is a diagram illustrating a gain mismatch/phase mismatch/path delay mismatch of an in-phase signal and a quadrature signal of a prior art transmitter 500, where the transmitter 500 includes two mixers 510 and 520 and an adder 530; and a path delay 540 shown in FIG. 5 is used to represent a delay difference between an in-phase channel and a quadrature channel, and is not a circuit element. As shown in FIG. 5, the transmitter 500 receives an in-phase signal I and a quadrature signal Q, and the in-phase signal I and a quadrature signal Q are processes by the mixers 510 and 520, the path delay 540 and the adder 530 to generate an output signal Vout, and the output signal Vout is radiated by an antenna. The local oscillation signals supplied to the mixers 510 and 520 are $(1+G)\cos(w_{LO}t+P)$ and $-\sin(w_{LO}t)$, respectively, where "G" is a value of I/Q gain mismatch, "P" is a value of I/Q phase mismatch, the "dt" is a value of I/Q path delay mismatch. Because the in-phase signal and the quadrature signal included in the output signal Vout may have the gain mismatch/phase mismatch/path delay mismatch, errors may be happened when the output signal Vout is received and processed by a receiver.

Figure 6:
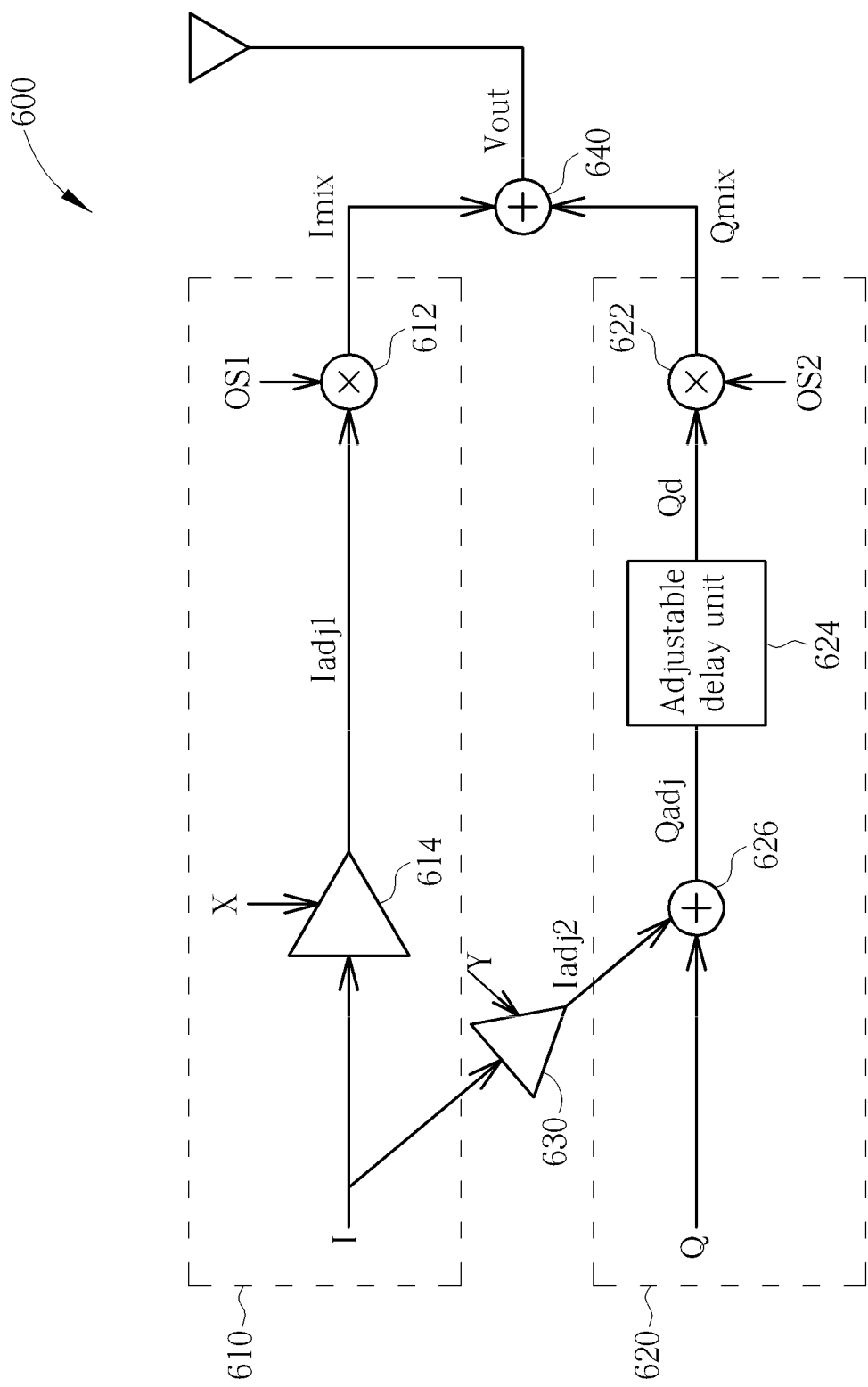
FIG. 6 is a diagram illustrating a diagram illustrating a transmitter according to one embodiment of the present invention.

Please refer to FIG. 6, which is a diagram illustrating a transmitter 600 according to one embodiment of the present invention. As shown in FIG. 6, the transmitter 600 includes a first channel 610, a second channel 620, a multiplier 630 and an adder 640, where the first channel 610 includes a mixer 612 and a multiplier 614, and the second channel 620 includes a mixer 622, an adjustable delay unit 624 and an adder 626. In addition, the transmitter 600 further includes a control unit (not shown) that is used to generate control signals according to the output signal Vout of the transmitter 600, and the control unit uses the control signals to adjust a factor X of the multiplier 614, a factor Y of the multiplier 630 and a delay amount of the adjustable delay unit 624.

In the operations of the transmitter 600, the multiplier 614 multiplies an in-phase signal I by the factor X to generate a first adjusted in-phase signal Iadj1, and the mixer 612 mixes the first adjusted in-phase signal Iadj1 with a local oscillation signal OS1 to generate a mixed in-phase signal Imix. At the same time, the multiplier 630 multiplies the in-phase signal I by the factor Y to generate a second adjusted in-phase signal Iadj2, the adder 626 adds the second adjusted in-phase signal Iadj2 and a quadrature signal Q to generate an adjusted quadrature signal Dadj, the adjustable delay unit 624 delays the adjusted quadrature signal Dadj to generate a delayed quadrature signal Qd, and the mixer 622 mixes the delayed quadrature signal Qd with a local oscillation signal OS2 to generate a mixer oscillation signal Qmix. Finally, the adder 640 adds the mixed in-phase signal Imix and the mixer oscillation signal Qmix to generate the output signal Vout.

Figure 7:
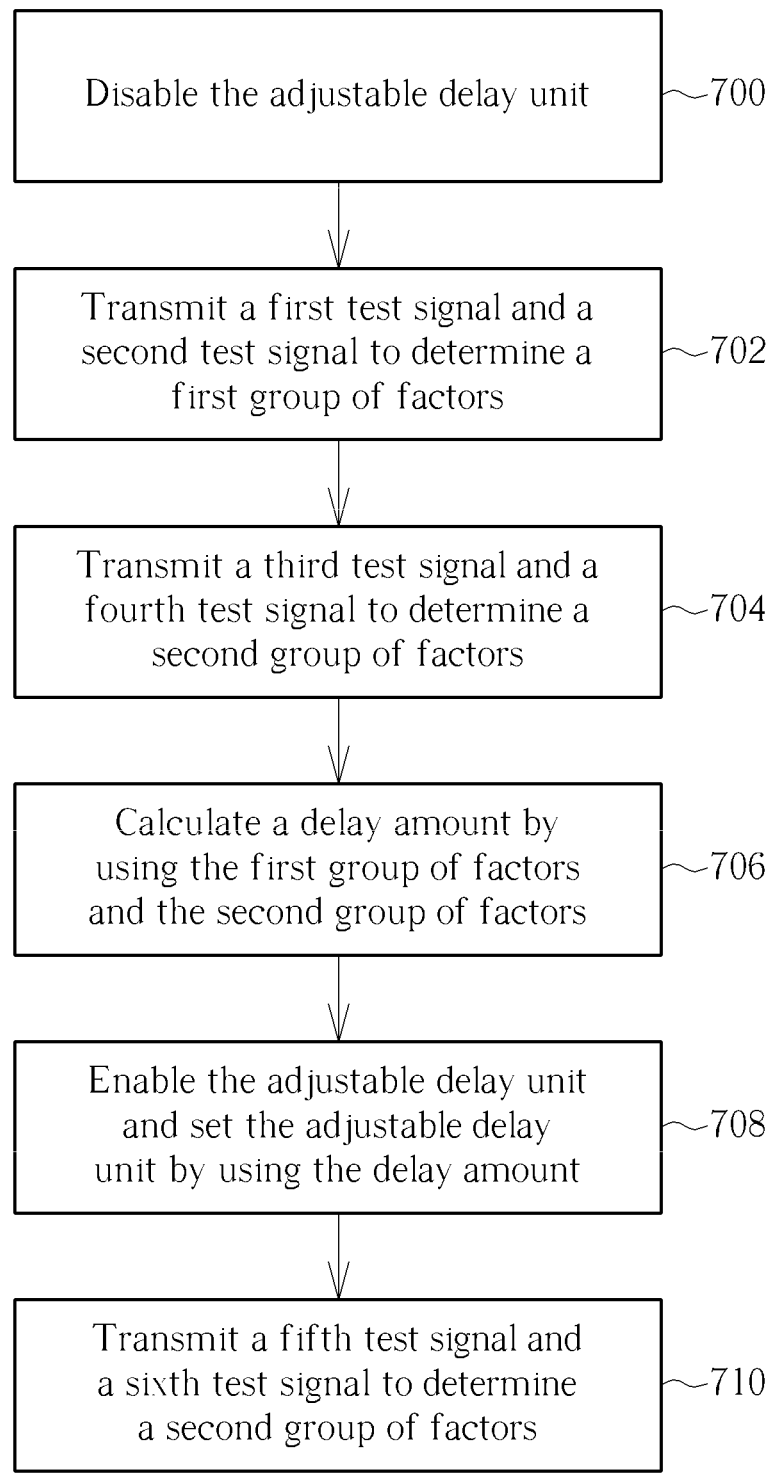
FIG. 7 is a flowchart of a method for compensating a mismatch of the in-phase signal and the quadrature signal of the transmitter according to one embodiment of the present invention

Please refer to FIG. 6 and FIG. 7 together, FIG. 7 is a flowchart of a method for compensating a mismatch of the in-phase signal and the quadrature signal of the transmitter 600 according to one embodiment of the present invention. Referring to FIG. 7, the flow is described as follows.

In Step 700, the adjustable delay unit 624 is disabled, that is the delay amount of the adjustable delay unit 624 is set to be 0. Then, in Step 702, the transmitter 600 transmits a first test signal and a second test signal, where the first test signal and the second test signal are the in-phase signal and quadrature signal, respectively, and each of them is a single tone signal having a frequency f1 (i.e., the first test signal serves as the in-phase signal I shown in FIG. 6, and the second test signal serves as the quadrature signal Q shown in FIG. 6). Then, the control unit (not shown) adjusts the factor X of the multiplier 614 and the factor Y of the multiplier 630 by referring to an image rejection ratio (IRR) calculated by using the output signal Vout to obtain a first group of factors (X1, Y1), where when using the first group of factors (X1, Y1) the transmitter 600 has the optimal IRR. Referring to FIG. 5 and FIG. 6, assuming that the oscillation signals supplied to the mixers 612 and 622 are $(1+G)\cos(w_{LO}t+P)$ and $-\sin(w_{LO}t)$, respectively, the value of Y1 should be close to $(-\tan(P+2\pi f1*dt))$ when the output signal Vout has the optimal IRR.

In Step 704, the transmitter 600 transmits a third test signal and a fourth test signal, where the third test signal and the fourth test signal are the in-phase signal and quadrature signal, respectively, and each of them is a single tone signal having a frequency f2 (i.e., the third test signal serves as the in-phase signal I shown in FIG. 6, and the fourth test signal serves as the quadrature signal Q shown in FIG. 6). Then, the control unit (not shown) adjusts the factor X of the multiplier 614 and the factor Y of the multiplier 630 by referring to an image rejection ratio (IRR) calculated by using the output signal Vout to obtain a second group of factors (X2, Y2), where when using the second group of factors (X2, Y2) the transmitter 600 has the optimal IRR. Referring to FIG. 5 and FIG. 6, assuming that the oscillation signals supplied to the mixers 612 and 622 are $(1+G)\cos(w_{LO}t+P)$ and $-\sin(w_{LO}t)$, respectively, the value of Y2 should be close to $(-\tan(P+2\pi f2*dt))$ when the output signal Vout has the optimal IRR.

In Step 706, the control unit uses the first group of factors (X1, Y1) and the second group of factors (X2, Y2) to calculate a delay amount of the adjustable delay unit 624. In detail, because in Steps 702 and 704 it is calculated that: $Y1 \approx (-\tan(P+2\pi f1*dt))$ and $Y2 \approx (-\tan(P+2\pi f2*dt))$, the delay amount dt between the in-phase signal I and the quadrature signal Q can be calculated by using the following formula:

$$dt \approx (Y1-Y2)/(2\pi(f2-f1)).$$

In addition, because $dt=\Delta*Ts=\Delta/Fs$, where Ts and Fs are a sampling clock period and a sampling clock frequency of an analog-to-digital converter (ADC) of the receiver 600, respectively, a delay parameter Δ used by the adjustable delay unit 624 can be calculated as follows:

$$\Delta = \frac{(Y1-Y2)}{\underbrace{2\pi(f2-f1)}_{Fs}} = \frac{(Y1-Y2)}{\underbrace{2\pi(\text{tone\_idx}(f2) - \text{tone\_idx}(f1))}_{\text{FFT\_pts}}},$$

where FFT_pts is a number of points used when performing a fast Fourier Transform upon the first test signal and the second test signal, and tone_index is an index of the tone/frequency.

In Step 708, the control unit (not shown) enables the adjustable delay unit 624 and sets adjustable delay unit 624 according to the delay parameter Δ or the delay amount dt.

In Step 710, the transmitter 600 transmits a fifth test signal and a sixth test signal, where the fifth test signal and the sixth test signal are the in-phase signal and quadrature signal, respectively, and each of them is a single tone signal having a frequency f3 (i.e., the fifth test signal serves as the in-phase signal I shown in FIG. 6, and the sixth test signal serves as the quadrature signal Q shown in FIG. 6). Then, the control unit (not shown) adjusts the factor X of the multiplier 614 and the factor Y of the multiplier 630 by referring to the IRR calculated by using the output signal Vout to obtain a third group of factors (X3, Y3), where when using the third group of factors (X3, Y3) the transmitter 600 has the optimal IRR. The third group of factors (X3, Y3) are used by the multipliers 614 and 630 of the transmitter 600 in the following operations.

In light of above, after the delay parameter Δ used in adjustable delay unit 624, the factor X3 of the multiplier 614 and the factor Y3 of the multiplier 630 are determined, the transmitter 600 can eliminate the gain mismatch/phase mismatch/path delay mismatch of the in-phase signal I and the quadrature signal Q included in the output signal Vout. When the output signal Vout is received and demodulated by a receiver, the gain/phase/path delay of the generated in-phase signal and quadrature signal will be matched.

It is noted that, in the embodiment shown in FIG. 6, the first channel 610 is the in-phase channel and the second channel 620 is the quadrature channel. In other embodiments, however, the first channel 610 can be the quadrature channel and the second channel 620 can be the in-phase channel, and the determination steps of the delay parameter Δ, the factor X3 of the multiplier 614 and the factor Y3 of the multiplier 630 are similar to the steps shown in FIG. 7 (only the formula for calculating the delay parameter Δ is different from the formula described in step 706). Because a person skilled in this art should understand how to derive the formula to obtain the delay parameter Δ and the two factors X3 and Y3 after reading the above-mentioned disclosure, further descriptions are omitted here.

Figure 8:
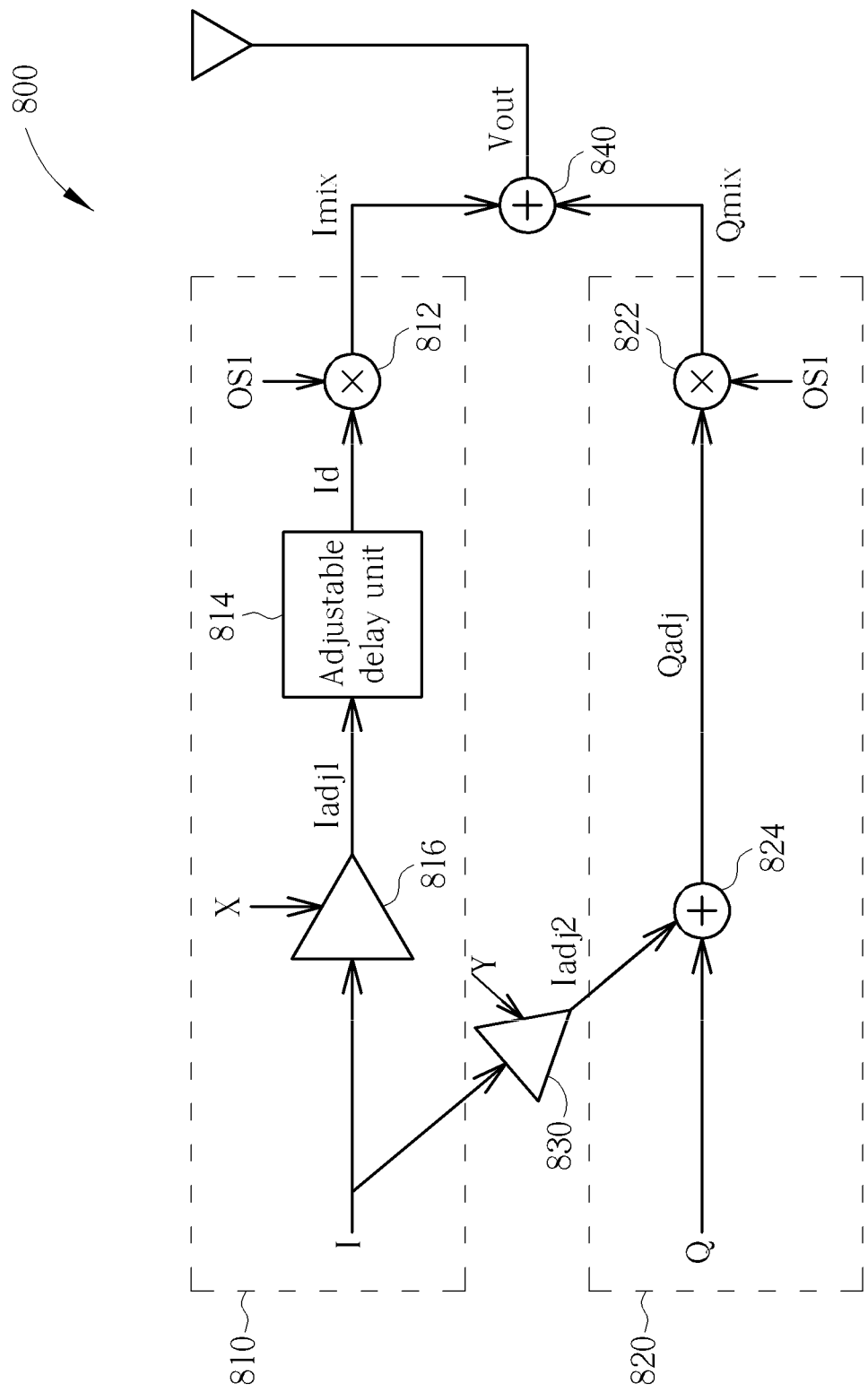
FIG. 8 is a diagram illustrating a diagram illustrating a transmitter according to another embodiment of the present invention.

Please refer to FIG. 8, which is a diagram illustrating a transmitter 800 according to another embodiment of the present invention. As shown in FIG. 8, the transmitter 800 includes a first channel 810, a second channel 820, a multiplier 830 and an adder 840, where the first channel 810 includes a mixer 812, an adjustable delay unit 814 and a multiplier 816, and the second channel 820 includes a mixer 822 and an adder 824. In addition, the transmitter 800 further includes a control unit (not shown) that is used to generate control signals according to the output signal Vout of the transmitter 800, and the control unit uses the control signals to adjust a factor X of the multiplier 816, a factor Y of the multiplier 830 and a delay amount of the adjustable delay unit 814.

In the operations of the transmitter 800, the multiplier 816 multiplies an in-phase signal I by the factor X to generate a first adjusted in-phase signal Iadj1, the adjustable delay unit 814 delays the first adjusted in-phase signal Iadj1 to generate a delayed in-phase signal Id, and the mixer 812 mixes the delayed in-phase signal Id with a local oscillation signal OS1 to generate a mixed in-phase signal Imix. At the same time, the multiplier 830 multiplies the in-phase signal I by the factor Y to generate a second adjusted in-phase signal Iadj2, the adder 824 adds the second adjusted in-phase signal Iadj2 and a quadrature signal Q to generate an adjusted quadrature signal Qadj, and the mixer 822 mixes the adjusted quadrature signal Qadj with a local oscillation signal 052 to generate a mixed quadrature signal Qmix. Finally, the adder 840 adds the mixed in-phase signal Imix and the mixed quadrature signal Qmix to generate an output signal Vout.

The method for determining the delay parameter of the adjustable delay unit 814, the factor X of the multiplier 816 and the factor Y of the multiplier 830 are similar to the steps shown in FIG. 7, and only the formula for calculating the delay parameter of the adjustable delay unit 814 is different from the formula for calculating the delay parameter Δ of the adjustable delay unit 624 of the transmitter 600 shown in FIG. 6 (in Step 706). Because a person skilled in this art should understand the following calculations after reading the above-mentioned disclosure (e.g., the delay parameter of the adjustable delay unit 814 can be calculated by the formula:

$$\Delta = -\frac{(Y1-Y2)}{\underbrace{2\pi(f2-f1)}_{Fs}} = -\frac{(Y1-Y2)}{\underbrace{2\pi(\text{tone\_idx}(f2) - \text{tone\_idx}(f1))}_{\text{FFT\_pts}}},$$

that is a negative of the delay parameter described in the embodiment shown in FIG. 6), further descriptions are omitted here.

It is noted that, in the embodiment shown in FIG. 8, the first channel 810 is the in-phase channel and the second channel 820 is the quadrature channel. In other embodiments, however, the first channel 810 can be the quadrature channel and the second channel 820 can be the in-phase channel, and the determination steps of the delay parameter Δ, the factor X3 of the multiplier 816 and the factor Y3 of the multiplier 830 are similar to the steps shown in FIG. 7 (only the formula for calculating the delay parameter Δ is different from the formula described in step 706). Because a person skilled in this art should understand how to derive the formula to obtain the delay parameter Δ and the two factors X3 and Y3 after reading the above-mentioned disclosure, further descriptions are omitted here.

Briefly summarized, in the method for compensating gain mismatch/phase mismatch/path delay mismatch of an in-phase signal and a quadrature signal of a receiver or a transmitter of the present invention, parameters for compensating the gain mismatch/phase mismatch/path delay mismatch can be determined correctly and efficiently, and prevent errors in the following operations.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for compensating a mismatch of an in-phase (I) signal and a quadrature (Q) signal of a receiver, wherein the receiver comprises: a first channel, comprising: a first mixer, for mixing a received signal with a first local oscillation signal to generate a first signal; a first multiplier, coupled to the first mixer, for generating an adjusted first signal according to the first signal; and an adder, coupled to the first multiplier; a second channel, comprising: a second mixer, for mixing the received signal with a second local oscillation signal to generate a second signal; and an adjustable delay unit, coupled to the second mixer, for delaying the second signal to generate a delayed second signal; and a second multiplier, coupled between the adjustable delay unit and the adder, for generating an adjusted second signal according to the delayed second signal, wherein the adder adds the adjusted first signal and the adjusted second signal to generate a compensated first signal; wherein the compensated first signal is one of the I signal and the Q signal, and the delayed second signal is the other one of the I signal and the Q signal; and the method further comprising: disabling the adjustable delay unit; receiving a first test signal to serve as the received signal to determine a first group of factors of the first multiplier and the second multiplier according to an image rejection ratio (IRR); receiving a second test signal to serve as the received signal to determine a second group of factors of the first multiplier and the second multiplier according to another IRR; and calculating a delay amount of the adjustable delay unit according to the first group of factors and the second group of factors.

2. The method of claim 1, wherein each of the first test signal and the second test signal is a single tone signal, and frequencies of the first test signal and the second test signal are different.

3. The method of claim 1, wherein each of the image rejection ratios are calculated by using the compensated first signal and the delayed second signal.

4. The method of claim 1, further comprising:
after calculating the delay amount of the adjustable delay unit, enabling the adjustable delay unit, and setting the adjustable delay unit by using the delay amount; and
receiving a third test signal to serve as the received signal to determine a third group of factors of the first multiplier and the second multiplier.

5. The method of claim 4, wherein the step of determining the third group of factors comprises:
receiving the third test signal, and determining the third group of factors of the first multiplier and the second multiplier according to an image rejection ratio.

6. A method for compensating a mismatch of an in-phase (I) signal and a quadrature (Q) signal of a receiver, wherein the receiver comprises: a first channel, comprising: a first mixer, for mixing a received signal with a first local oscillation signal to generate a first signal; an adjustable delay unit, coupled to the first mixer, for delaying the first signal to generate a delayed first signal; a first multiplier, coupled to the adjustable delay unit, for generating an adjusted first signal according to the delayed first signal; and an adder, coupled to the first multiplier; a second channel, comprising: a second mixer, for mixing the received signal with a second local oscillation signal to generate a second signal; and a second multiplier, coupled between the second mixer and the adder, for generating an adjusted second signal according to the second signal, wherein the adder adds the adjusted first signal and the adjusted second signal to generate a compensated first signal; wherein the compensated first signal is one of the I signal and the Q signal, and the second signal is the other one of the I signal and the Q signal; and the method further comprising: disabling the adjustable delay unit; receiving a first test signal to serve as the received signal to determine a first group of factors of the first multiplier and the second multiplier according to an image rejection ratio (IRR); receiving a second test signal to serve as the received signal to determine a second group of factors of the first multiplier and the second multiplier according to another IRR; and calculating a delay amount of the adjustable delay unit according to the first group of factors and the second group of factors.

7. The method of claim 6, wherein each of the first test signal and the second test signal is a single tone signal, and frequencies of the first test signal and the second test signal are different.

8. The method of claim 6, wherein each of the image rejection ratios are calculated by using the compensated first signal and the second signal.

9. The method of claim 6, further comprising:
after calculating the delay amount of the adjustable delay unit, enabling the adjustable delay unit, and setting the adjustable delay unit by using the delay amount; and
receiving a third test signal to serve as the received signal to determine a third group of factors of the first multiplier and the second multiplier.

10. The method of claim 9, wherein the step of determining the third group of factors comprises:
receiving the third test signal, and determining the third group of factors of the first multiplier and the second multiplier according to an image rejection ratio.

\* \* \* \* \*